O. L. Gaylord.
Wheel Cultivator.
N° 95,790. Patented Oct. 12, 1869.
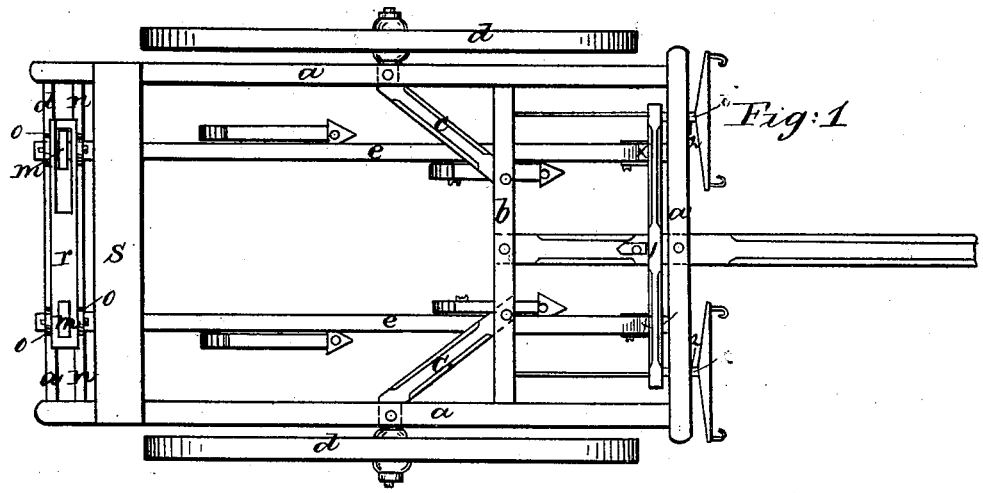
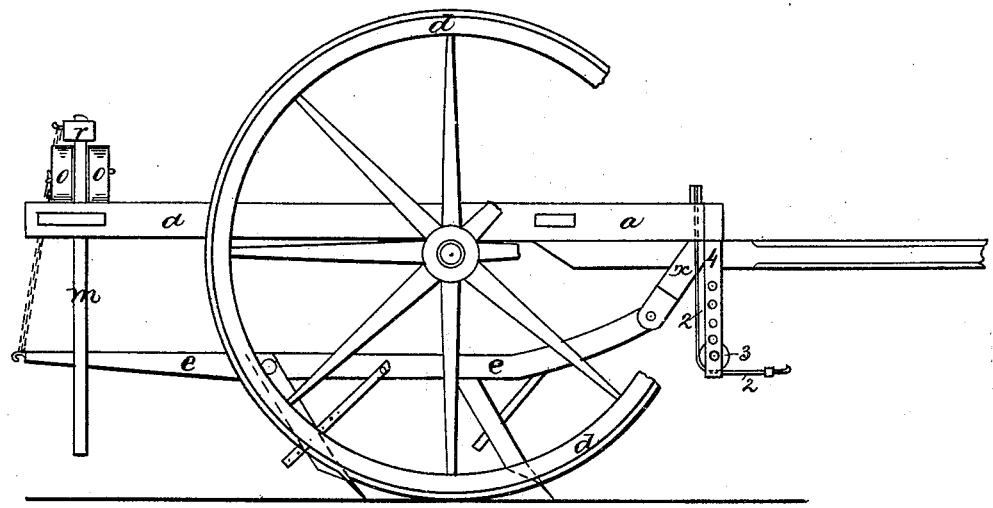
Witnesses;
Thos. H. Hutchins
N. J. Hutchins
Inventor.
Oscar L. Gaylord

UNITED STATES PATENT OFFICE.

OSCAR L. GAYLORD, OF PLAINFIELD, ILLINOIS.

IMPROVEMENT IN SULKY-CULTIVATORS.

Specification forming part of Letters Patent No. 95,790, dated October 12, 1869.

*To all whom it may concern:*

Be it known that I, OSCAR L. GAYLORD, of Plainfield, in Will county, State of Illinois, have invented a new and useful Improvement on a Sulky-Cultivator; and I do hereby declare the following to be a full, clear, and exact description of the same, reference being had to the annexed drawings, making a part of this specification, in which—

Figure 1 is a plane view on the top, and Fig. 2 a side elevation.

To enable others skilled to make and use my invention, I will proceed to explain the construction and operation of the same.

$a$ is the main frame, supported by the wheels $d$, in the ordinary way, and to which the shovel-beams $e$ are attached by the hanging post or arm $x$. The rear ends of the beams $e$ pass through the slotted upright posts $m$, which pass up through between the main frame $a$ and the cross-bar $n$, as shown in Fig. 1, and are suspended on the rollers $o$, which roll from one side to the other on the frame, to give a horizontal motion to the shovels, as shown. This part of the cultivator I do not claim as new.

The two principal improvements which I claim to have made are the bent or diagonal axles $c$, running diagonally across the frame from the outer side to the cross-bar $b$, as shown in Fig. 1. The object of this is to at once leave the space open in the center of the machine, so the way will be clear to see the row, and also to brace the machine in that direction, which is a very desirable feature.

It is frequently the case that the shovels on one side will catch into some obstruction and twist the frame in some instances so severely as to break off the tenons. This improvement at once simplifies and strengthens the machine and overcomes that difficulty.

The other improvement I claim to have made is in the manner of pulling. The double-tree 1 rocks upon the tongues, as shown in Fig. 1. Attached to each end is a strap or chain, which passes down under the pulley 3, and has the whiffletree attached at the end, as shown in Fig. 2. The pulley is arranged to be placed at any point up or down by means of the row of holes in the suspended arm 4, as shown. It will be readily observed that by this device the draft may be put at any desired point, which is a very necessary feature, to accommodate the machine to the size of the team, the different kinds of soil, and to make it run easy.

The whole machine may be constructed of any suitable material—such as those of this class are made of.

Having thus described my invention, what I claim as new, and desire to secure by Letters Patent, is as follows:

The combination of the main frame $a$, diagonal axles $c$ $c$, cross-bar $b$, double-tree 1, straps 2 2, pulleys 3 3, and suspended arms 4 4, arranged to operate as and for the purposes set forth.

OSCAR L. GAYLORD.

Witnesses:
 THOS. H. HUTCHINS,
 N. J. HUTCHINS.